(12) United States Patent
Skov et al.

(10) Patent No.: US 6,403,197 B1
(45) Date of Patent: Jun. 11, 2002

(54) FILTER MATERIAL

(75) Inventors: Martin Skov; Heinz Wandel, both of Walddorfhaslach (DE)

(73) Assignee: Moldex-Metric, Inc., Culver City, CA (US)

( * ) Notice: Subject to any disclaimer, the term of this patent is extended or adjusted under 35 U.S.C. 154(b) by 0 days.

(21) Appl. No.: 09/389,847

(22) Filed: Sep. 2, 1999

(51) Int. Cl.[7] .............................. B32B 3/28; A01J 21/00; H62B 23/02; B01D 39/08
(52) U.S. Cl. ........................ 428/182; 428/183; 425/336; 425/369; 128/205.29; 128/206.17; 128/206.19; 128/206.21; 55/500; 55/521; 55/DIG. 35
(58) Field of Search ..................... 55/521, 497, 500, 55/501, DIG. 35; 428/182, 183; 425/328, 336, 369; 128/206.17, 205.29, 206.19, 206.21; 156/209

(56) References Cited

U.S. PATENT DOCUMENTS

| | | | | |
|---|---|---|---|---|
| 1,444,397 A | * | 2/1923 | Seigle | 428/183 |
| 1,975,548 A | * | 10/1934 | Ives | 428/183 |
| 2,253,718 A | * | 8/1941 | McKeage | 428/183 |
| 2,758,047 A | * | 8/1956 | Dowd | 428/183 |
| 3,029,812 A | * | 4/1962 | Matheson | 128/146 |

* cited by examiner

Primary Examiner—Donald J. Loney
(74) Attorney, Agent, or Firm—Charles H. Schwartz

(57) ABSTRACT

A filter material laid in folds in a plurality of folds, characterized in that the folds are provided with at least one bending portion having a bending resistance moment that is reduced in comparison with the remaining portions and a method and apparatus for producing same.

23 Claims, 5 Drawing Sheets

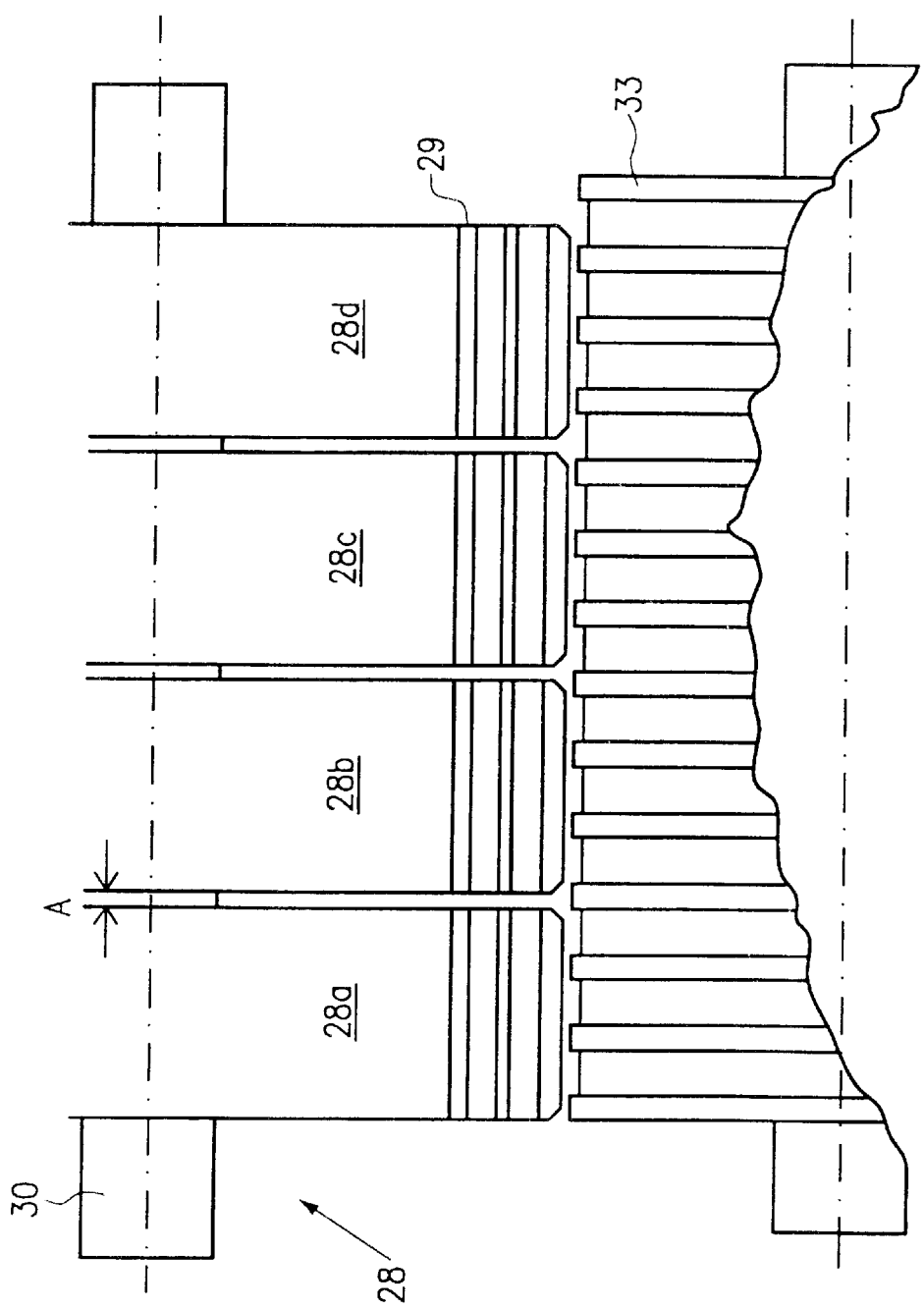

FILTER MATERIAL

BACKGROUND OF THE INVENTION

The present invention relates to a folded filter material of the type formed by bending.

Such a filter material is known from U.S. Pat. No. 3,029,812. The known filter material is used as an insert in a respirator or breathing mask and consists of a web of paper that has been laid in folds. However, when a filter material is formed that has been provided with folds, the risk arises that the folds collapse, whereby the passage resistance is increased, which is in particular unavoidable in cases where the filter material is bent around an axis extending in a direction transverse to the folds (because the fold vertex has a greater distance to the bending axis than to the fold base).

It is the object of the present invention to provide a filter material laid in folds which shows improved flexibility.

SUMMARY OF THE INVENTION

This object is achieved by a filter material formed by bending and laid in a plurality of folds and with said folds provided with at least one bending portion having a bending resistance moment that is reduced in comparison with the remaining portions. The flexibility of the fold material is improved through the arrangement of bending portions according to the invention without the filtering effect being deteriorated, with the filter material being also bendable around a bending axis extending in a direction transverse to the extension of the folds, without the folds collapsing.

Particularly efficient bending portions which, in addition, can be produced in a simple manner are obtained by shaping the folds section-wise in an incomplete manner. Such an incomplete fold configuration may be characterized either alternatively or at the same time. The strip-like arrangement of the bending portions in a direction across the folds further facilitates bending of the folds. A particularly preferred layered structure of the filter material layer and of the filter material may also be used.

The filter material of the invention is particularly suited for producing the respirator or breathing mask for personal protection, said mask containing a shell-shaped mask body, a so-called half mask, which covers a wearer's mouth and nose. A particularly preferred layered structure of said respirator or breathing mask may use the filter material of the invention.

A particularly preferred apparatus for producing the filter material of the invention uses at least two folding rolls arranged at an axial distance relative to one another. The filter material layer can move freely owing to the absence of any support surface within the distance between the partial rolls, so that the desired incomplete fold configuration can be achieved in a particularly simple and reliable manner.

BRIEF DESCRIPTION OF THE DRAWINGS

The present invention will now be explained in more detail in the following text with reference to the drawings, in which:

FIG. 9 is an enlarged view of section IV—IV of FIG. 8.

DETAILED DESCRIPTION OF THE INVENTION

Figure 1:
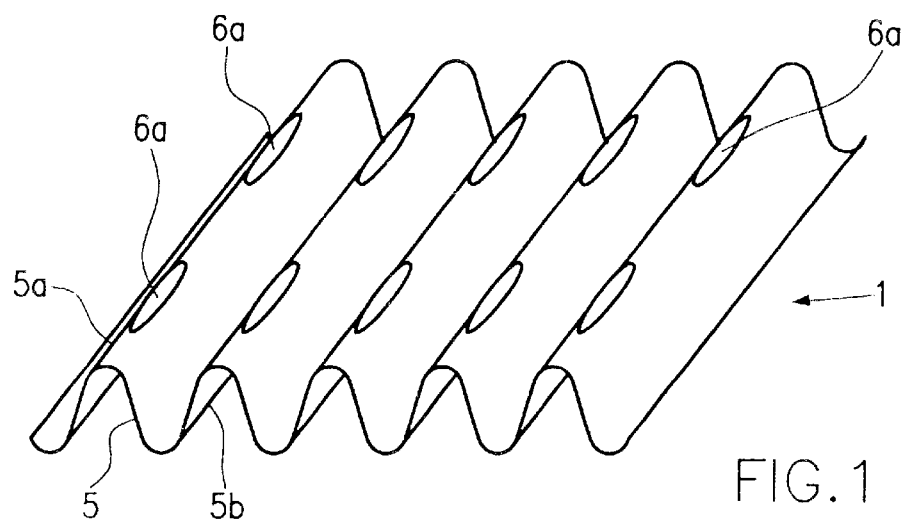
FIG. 1 is a perspective diagrammatic view showing a section of a filter material according to the invention.
Figure 2:
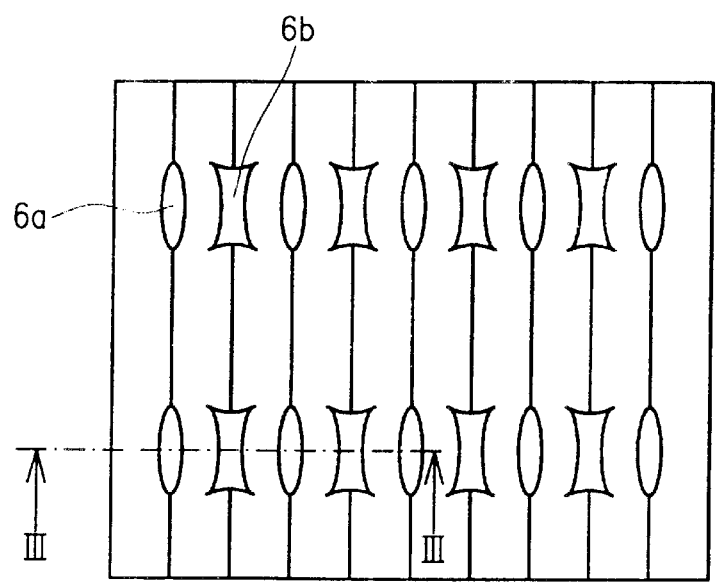
FIG. 2 is a top view on the filter material according to FIG. 1.
Figure 3:
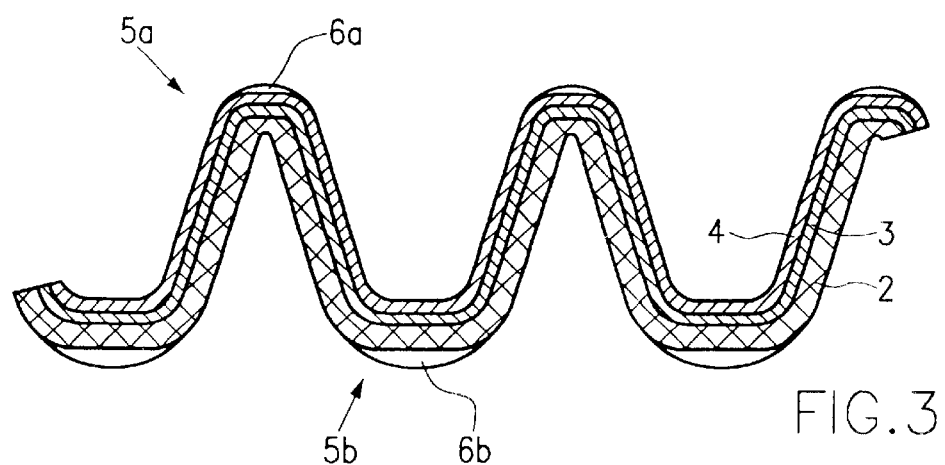
FIG. 3 is an enlarged sectional view in line III—III of FIG. 2.

FIGS. 1–3 shows a section consisting of a web of a filter material layer 1 which, as becomes apparent from the enlarged sectional view shown in FIG. 3, is composed of three layers, namely a stabilization layer 2 consisting of a netting of thermoplastic material, in particular ethylene vinyl acetate, a center layer consisting of the filter material proper which is designed in response to the materials to be respectively filtered out, i.e., it may, for instance, be a particle filter material or a material containing activated carbon, and an inner cover layer 4 consisting of a spun-bonded fabric, or the like, e.g. a spun-bonded fabric of a thermoplastic material, in particular polypropylene.

All of the three layers 2 to 4 of the filter material layer 1 are laid in a plurality of parallel and identically formed folds 5 with fold backs 5a, 5b facing away from one another. Both on the back 5a and on the back 5b of each fold, i.e. at both sides of the filter material layer 1, there are provided bending portions 6a and 6b have the shape of a saddle which starting from the respective back 5a, 5b is recessed into the interior of the fold, i.e. the folds 5 have a reduced depth in the bending portions 6a, 6b and the curvature of the backs 5a, 5b is less pronounced.

The bending portions 6a of neighboring folds 5 are aligned with one another, so that strips of bending portions 6a extend across the filter material layer 1. The bending portions 6b of the fold backs 5b on the back of the filter material layer 1 in FIGS. 1 and 2 can also be aligned with the bending portions 6a on the front side, but may also extend in offset fashion relative to said bending portions 6a. In the illustrated embodiment, the bending portions 6a and 6b extend in parallel strips in a direction transverse to the extension of folds 5. However, they can also extend in zigzag fashion or may be arranged in any other suitable direction.

Figure 4:
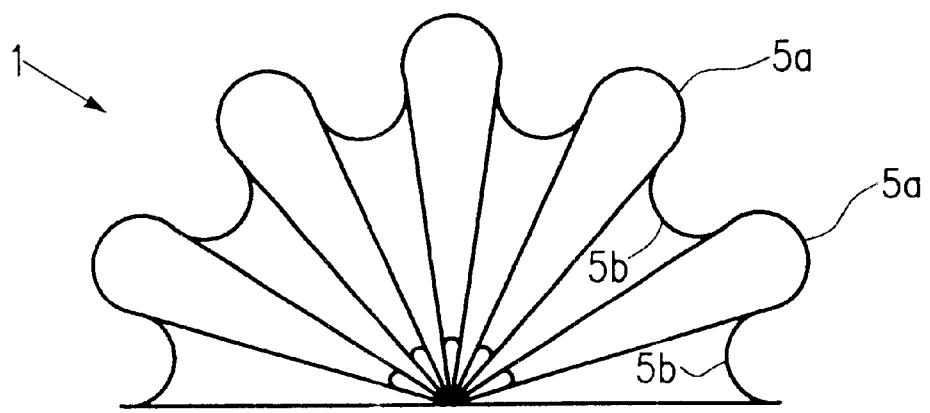
FIG. 4 is a view of a bent filter material along the longitudinal direction of the folds.
Figure 5:
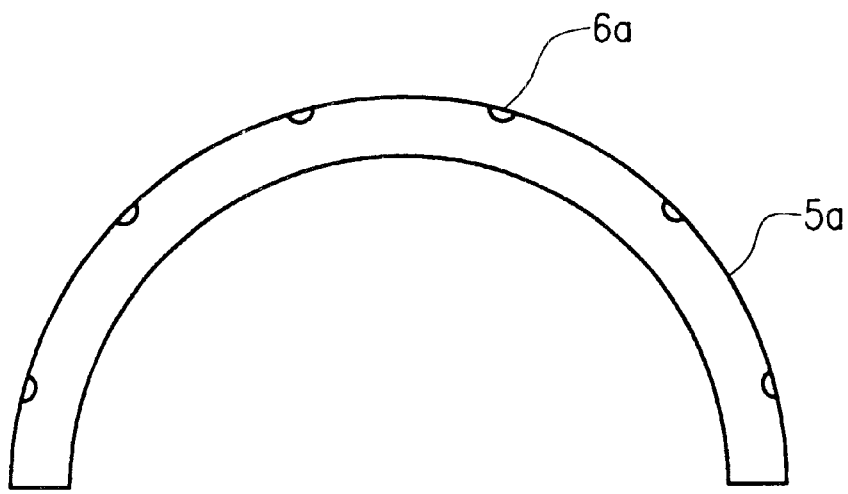
FIG. 5 is a view of a bent filter material in a direction transverse to the longitudinal direction of the folds.
Figure 6:
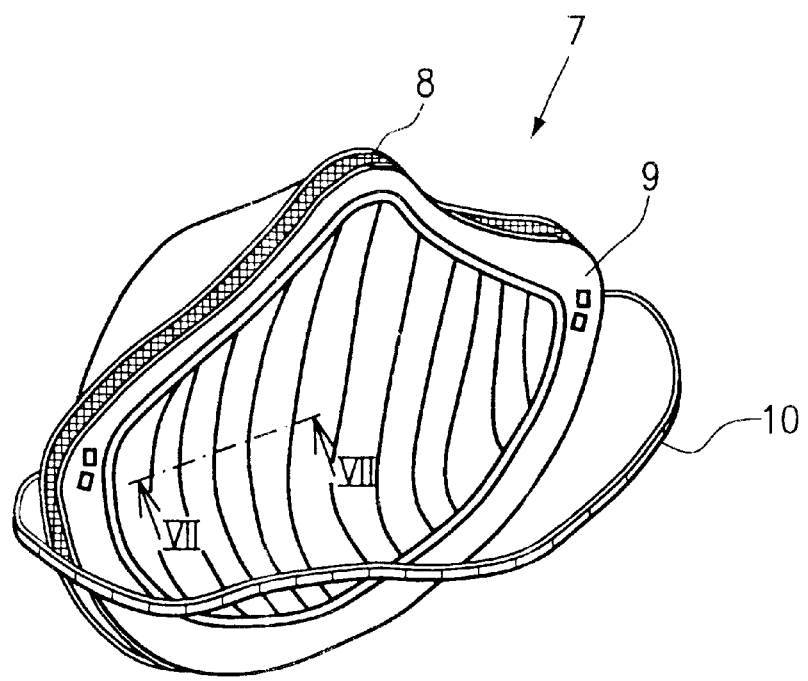
FIG. 6 shows a respirator or breathing mask produced with the filter material of the invention.
Figure 7:
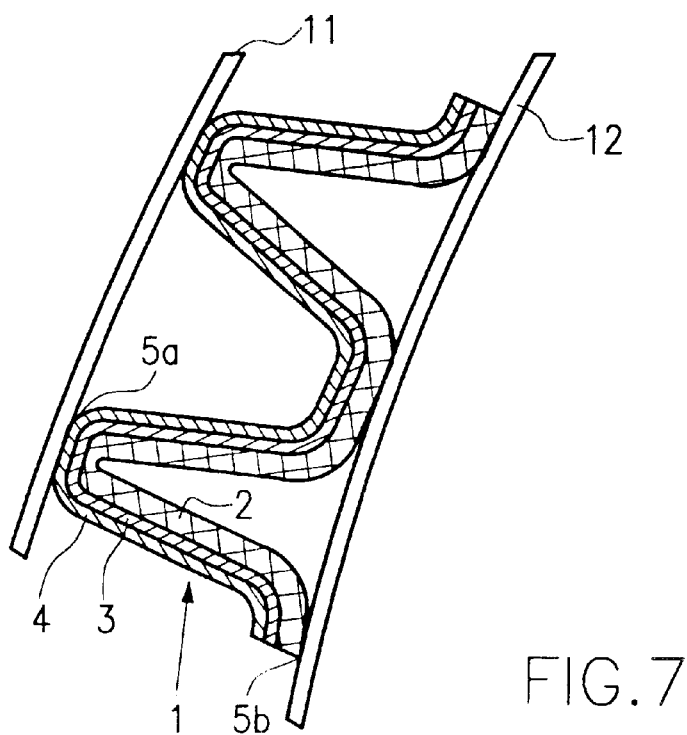
FIG. 7 is an enlarged view of section VII—VII of FIG. 6.

As shown in FIGS. 4 and 5, the filter material layer 1 according to the invention can be bent in the transverse and also in the longitudinal direction of the folds, i.e. about a bending axis extending in parallel with the fold backs 5a, 5b and also about a bending axis extending in a direction transverse thereto, without the folds 5 collapsing, tilting side-wards or being pressed flat, as is otherwise unavoidable due to the different distances of the two fold backs 5a and 5b relative to the bending axis. The interruption as created by the bending portions 6a, 6b in the course of the respective fold backs 5a, 5b further enhances the stiffness of the folds and thus the dimensional stability of the folds with respect to the respiratory pressure during inhalation and exhalation when the filter material, as shown in FIGS. 6 and 7, is used for a respirator or breathing mask 7. The respirator or breathing mask 7 is a so-called half mask 8 having a shell-shaped mask body which extends over a wearer's mouth and nose and is designed on all sides such that it forms a sealing edge 9 with the wearer's face. A rubber band 10 is provided for pulling the mask body 8 towards the wearer's face.

The filter material from which the mask body 8 has been made consists of the filter material layer 1 which is laid in folds and arranged with its back 5a facing to the outside. The backs 5a have connected thereto, i.e. at their exterior spun-bonded fabric layer, an outer stabilization layer 11 are preferably secured to the filter material layer 1 by point-wise attachment under the action of heat, with the point-shaped attachment locations being positioned, at least predominantly, outside the bending portions 6a and 6b.

Figure 8:
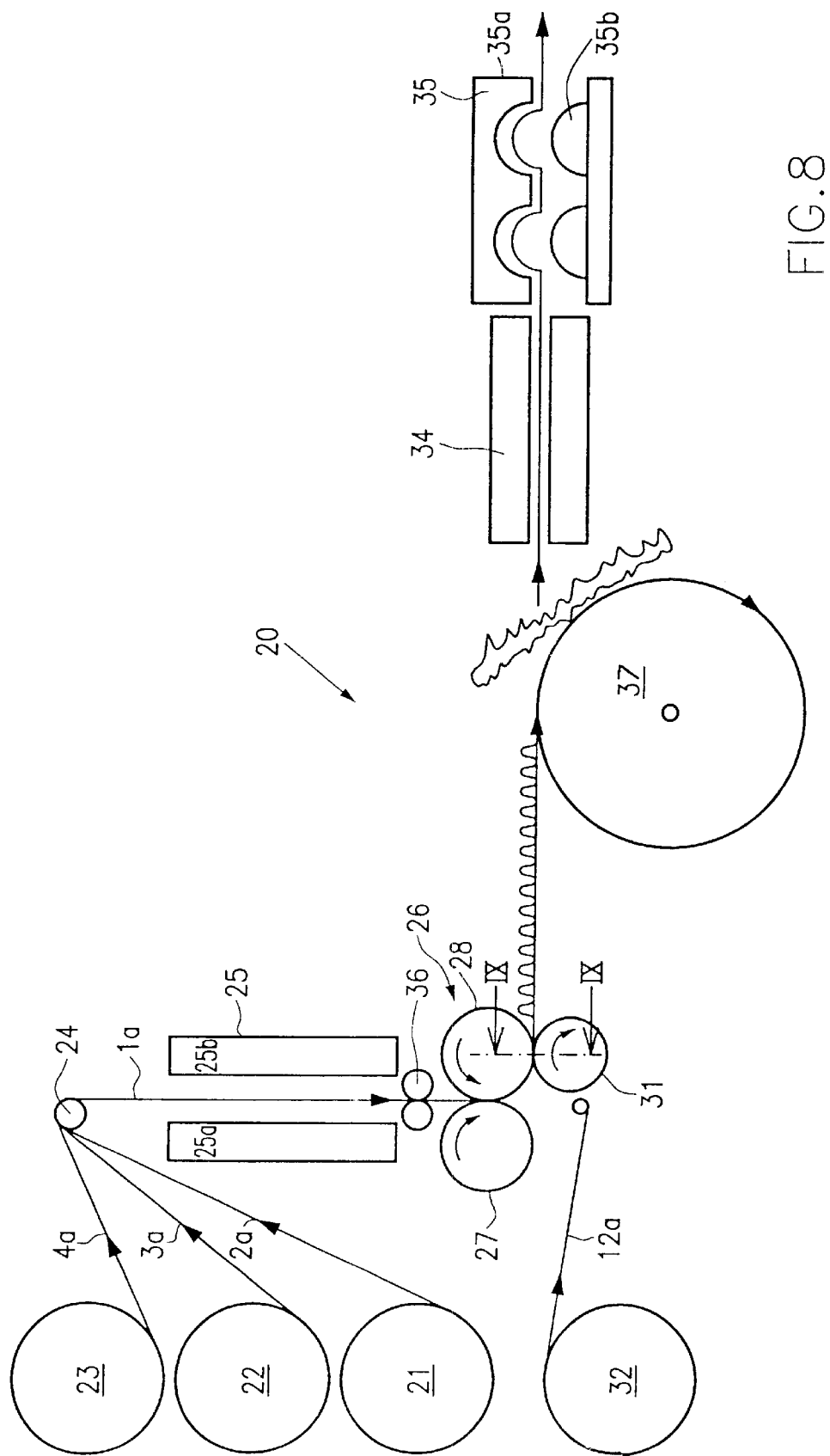
FIG. 8 is a diagrammatic illustration of an apparatus according to the invention.

FIGS. 8 and 9 illustrate an apparatus 20 for producing the inventive filter material 1 and a mask body 8 made from said filter material.

The apparatus 20 includes a plurality of supply rolls, of which three supply rolls 21, 22 and 23 are drawn that respectively contain one of the three layers 2, 3, 4 of the filter material, each in the form of an endless web. In the illustrated embodiment, the bottom supply roll 21 contains a web 2a of the support netting 2, the central supply roll 22 contains a web 3a of the filter material 3 proper, and the upper roll 23 a web 4a of the spun-bonded fabric 4. The three webs 2a, 3a and 4a are combined by a roll 24 to form a common web 1a of the filter material 1.

Subsequently, the web 1a passes through a heating device 25 which contains two opposite heating plates 25a and 25b acting on the surfaces of the web 1a. The filter material 1 is heated by the heating plates up to the softening temperature of one of the webs, but not beyond the melt temperature of the web having the lowest melting point. Subsequently, the web 1a of the filter material 1 is fed via guide rolls 36 to a fold-laying device 26. The fold laying device 26 contains two toothed rolls 27 and 28 which are provided with teeth extending in axial direction (FIG. 9 illustrates roll 28 with teeth 29 and roll 27 would be substantially identical), whose shape and size are adapted to the shape and size of the desired folds 5. The two toothed rolls 27 and 28 are driven in opposite directions and are so close to one another that the teeth of the two toothed rolls 27 and 28 are meshing and define a nip adapted to the thickness of the web 1a of the filter material layer 1, with the nip depending on the material used and on the necessary or desired degree of compaction of the filter material web 1a.

As shown in FIG. 9, at least one of the toothed rolls, in the illustrated embodiment the toothed roll 28, consists of a plurality of partial rolls, represented by four partial rolls 28a, b, c, d which are seated at an axial distance A on a common drive shaft 30 in such a manner that all of the partial rolls 28a to 28d are driven in synchronism with teeth 29 that are aligned in axial direction.

The other toothed roll 27 can also consist of a corresponding number of partial rolls (not shown) which are adjoined at the same axial distance. A.

Hence, when the two toothed rolls 27 and 28 meet the filter material web 1a in the nip, all webs 2a to 4a of the filter material web 1a are laid in folds 5 due to the engagement of the teeth 29 in the two toothed rolls 27 and 28. At distance A, however, there is no meshing engagement of the teeth, so that the filter material web 1a is more or less left to itself at this place and assumes a shape which is defined by the force which is exerted on the portions within distance A via the neighboring portions of the web 1a which are in engagement with the teeth 29. At any rate, this effects an incomplete shape of the folds 5 with the above-described, saddle-shaped bending portions 6a and 6b. When both toothed rolls 27 and 28 consist of spaced-apart partial rolls, the bending portions are, as shown in FIG. 1, provided at both sides of the material. If the bending portions are only required at one side of the material, it is sufficient when only one of the two toothed rolls 27 and 28 is composed of the spaced-apart partial rolls.

A hot roll 31 is arranged after the fold laying device 26, when viewed in the conveying direction, for either interconnecting the individual webs 2a, 3a, 4a of the web 1a even more strongly than has already been effected by the heating device 25 and the fold laying device 26, or, if necessary, for providing the folded filter material layer with a further cover layer web 12a for the cover layer 12. The cover layer web 12a is also removed from a supply roll 32.

As shown in FIG. 9, the hot rolls 31 is provided on its circumference with a plurality of parallel annular webs 33 which project beyond the circumference of the hot roll 31 at an axial distance relative to one another. In the illustrated embodiment, the hot roll 7 cooperates with the toothed roll 28, with the outer circumference of the annular webs 33 defining, together with the tooth tips of the toothed roll 28, a nip which is slightly smaller than the thickness of the filter material web 1a, e.g. it may range between 0.25 and 0.30 mm. The temperature of the hot roll is at about 155° in cases where the cover layer 12 is a spun-bonded fabric of polypropylene and is to be applied to that side of the filter material web 1a on which the ethylene-vinyl-acetate support netting of web 2a is positioned.

The hot roll 31 is vertically positioned underneath the toothed roll 28, which, in turn, is horizontally located next to the toothed roll. 27. The filter material web 1a must thus follow a change in conveying direction by 90°, i.e. it remains positioned on the teeth 29 of the toothed roll 28 although it has already left the nip between the two toothed rolls 27 and 28. The cover layer web 12a is introduced between the hot roll 31 and the already folded filter material web 1a and is attached or welded to the backs 5b of the folds 5 through the point-like contact between the tips of the teeth 29 of the toothed roll 28 and the circumference of the annular webs 33 extending in a direction perpendicular thereto. The distance of the backs 5b of the folds 5 is thereby fixed by the cover layer web 12a to the size of the teeth 29 of the toothed roll 28.

The filter material can then be wound onto a roll 37 for further use, or it is directly processed into the mask bodies 8. For the production of the mask body 8, the filter material is heated in a further heating device 34, possibly covered with a web or with sections of the support netting 11, and is inserted section-wise into a hot mold 35 which consists of an outer and inner mold half 35a and 35b, which halves are subsequently united to form the mask body 8. The mask body 8 is subsequently processed in the conventional manner, i.e., it is for example provided with the rubber band 10, an exhalation valve or other components.

Hence, for the production of a filter material wherein a filter material layer is laid into a plurality of folds, one proceeds such that bending portions having a bending resistance reduced in comparison with the remaining portions are molded into the folds. These bending portions are produced by molding or shaping the folds in these areas in an incomplete manner. The folds are here formed in the bending portions at a reduced depth and/or the fold backs are made flatter in these portions. Furthermore, the filter material can contain at least two layers which are point-wise connected to one another.

In a modification of the above-described and drawn embodiment, bending portions may only be provided at one side of the filter material, which is achieved in a simple manner in that only one of the two toothed rolls includes spaced-apart partial rolls while the teeth of the other toothed roll pass axially. The filter material can thus be further processed in the state as removed from the fold-laying device. Instead of the toothed rolls, use could be made of toothed plates including interruptions in the tooth extension. Finally, the invention is not limited to the above-described materials, but it is possible to use all suitable thermomoldable materials. Moreover, filters need not necessarily be produced from the fold material; the fold material which is provided with bending portions is also suited for flat filters as the bending portions prevent folds from collapsing, from being pressed flat or from being folded over, or at least reduce such occurrences, when bending forces are exerted on the filter, e.g. by respiratory pressure or the like, during use.

What is claimed is:

1. A filter material, in particular for filters formed by bending, comprising a filter material layer laid in a plurality of folds and having fold backs facing away from each other characterized in that said fold backs of said folds are each provided with at least one bending portion having a bending resistance moment that is reduced in comparison with the remaining portions.

2. The filter material according to claim 1, characterized in that each said bending portion has an incomplete fold configuration.

3. The filter material according to claim 2, characterized in that said fold backs of said folds in each said bending portion is less deep than outside said bending portion.

4. The filter material according to claim 2 characterized in that said fold backs of said folds in each said bending portion has a curvature flatter than that outside said bending portion.

5. The filter material according to claim 1, characterized in that said fold backs of said folds in each said bending portion has a curvature flatter than that outside said bending portion.

6. The filter material according to claim 1, characterized in that said fold backs each has a plurality of bending portions arranged in the form of strips and arranged in parallel with and at a distance from one another.

7. The filter material according to claim 1, characterized in that said filter material layer which is laid in folds contains a filtering layer and a stabilization layer.

8. The filter material according to claim 1, characterized in that said filter material layer which is laid in folds contains at least one cover layer.

9. The filter material according to claim 1, characterized in that said filter material layer which is laid in folds is covered with at least one non-folded cover layer which is section-wise connected to the folds of said filter material layer.

10. The filter material layer according to claim 7, characterized in that said stabilization layer is a netting of plastics.

11. The filter material according to claim 8, characterized in that said cover layer is a spun-bonded fabric of plastics.

12. A respirator comprising a shell-shaped mask body containing filter material laid in a plurality of folds having fold backs facing away from each other, characterized in that said fold backs of said folds are each provided with at least one bending portion having a bending resistance moment that is reduced in comparison with the remaining portions.

13. The respirator according to claim 12 additionally including a stabilization layer, wherein said stabilization layer is oriented towards the inside of said mask body.

14. The respirator according to claim 12, characterized in that a non-folded stabilization layer is arranged on the outside of said mask body and a non-folded cover layer on the inside.

15. An apparatus for producing a filter material having a filter material layer laid in a plurality of folds having fold backs facing away from each other, characterized by first and second folding surfaces provided with elongated folding teeth, wherein said first folding surface is provided with interruptions in its teeth and said second folding surface cooperates for forming fold and with said second folding surface also provided with interruptions in its teeth, said interruptions being opposite to the interruptions of said first folding surface for forming bending portions.

16. The apparatus according to claim 15 characterized in that said interruptions extend in the manner of a strip across each of said plurality of folding teeth.

17. An apparatus according to claim 15, characterized in that said folding surface cooperates with a hot surface.

18. The apparatus according to claim 17 characterized in that fixing elevations are provided between said hot surface and said folding teeth.

19. The apparatus according to claim 15, characterized in that said folding teeth are arranged on the circumference of a pair of toothed rolls.

20. The apparatus according to claim 19 characterized in that said interruptions extends in circumferential direction annularly around said toothed rolls.

21. The apparatus according to claim 19, characterized in that said folding rolls comprise at least two partial rolls, which are arranged at an axial distance relative to each other.

22. The apparatus according to claim 18, characterized in that said fixing elevations are formed as annular webs around the circumference of a hot roll which, cooperates with said toothed rolls provided with folding teeth.

23. The apparatus according to claim 19, characterized in that said first toothed roll, cooperates with a hot roll and said second toothed roll, cooperates with said first toothed roll.

* * * * *